March 6, 1951
F. JOHNSON
2,544,024
VINE PULLER AND CUTTER
Filed Nov. 5, 1948
7 Sheets-Sheet 1
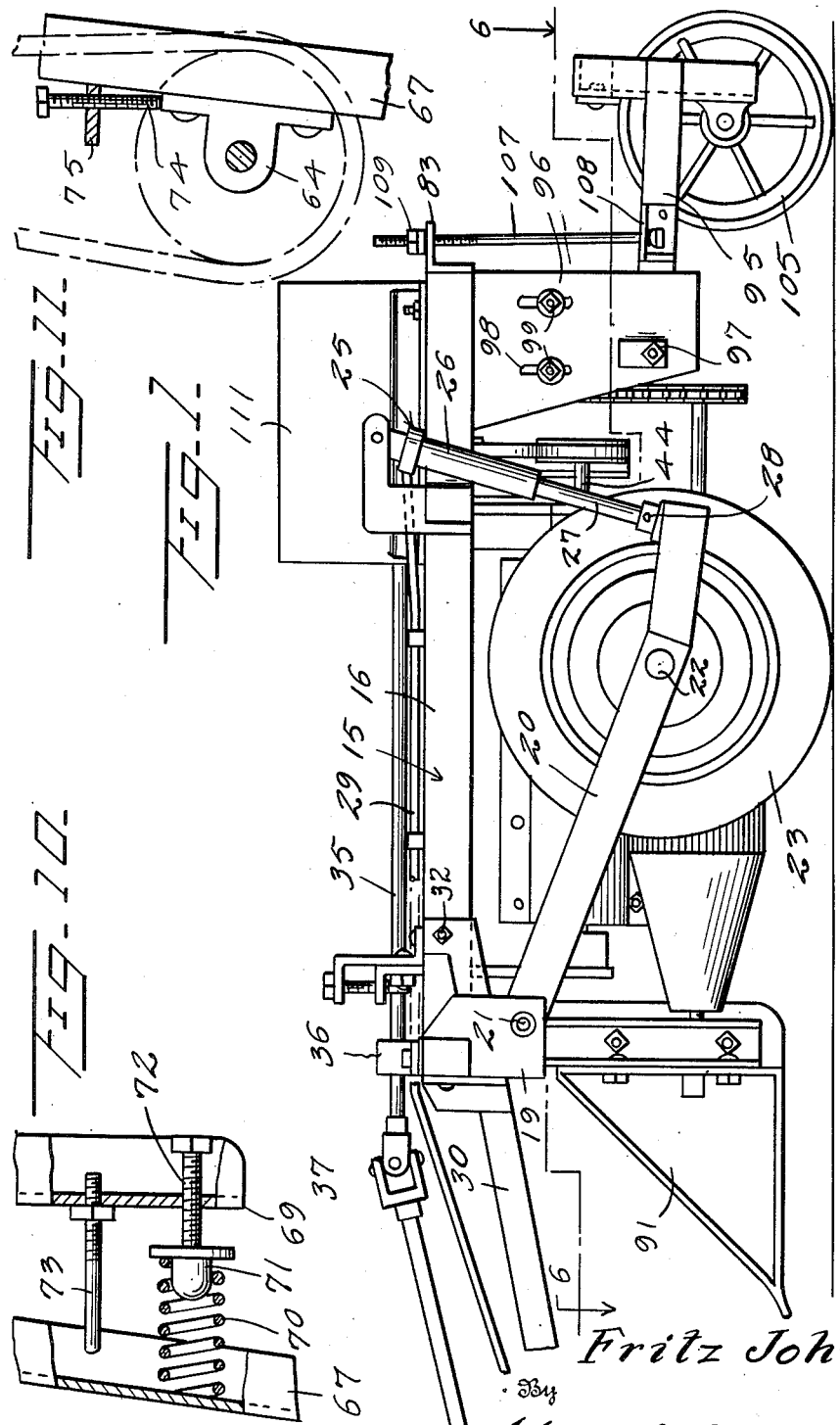
Inventor
Fritz Johnson
By
Kimmel & Crowell Attys.

March 6, 1951  F. JOHNSON  2,544,024
VINE PULLER AND CUTTER
Filed Nov. 5, 1948  7 Sheets-Sheet 2
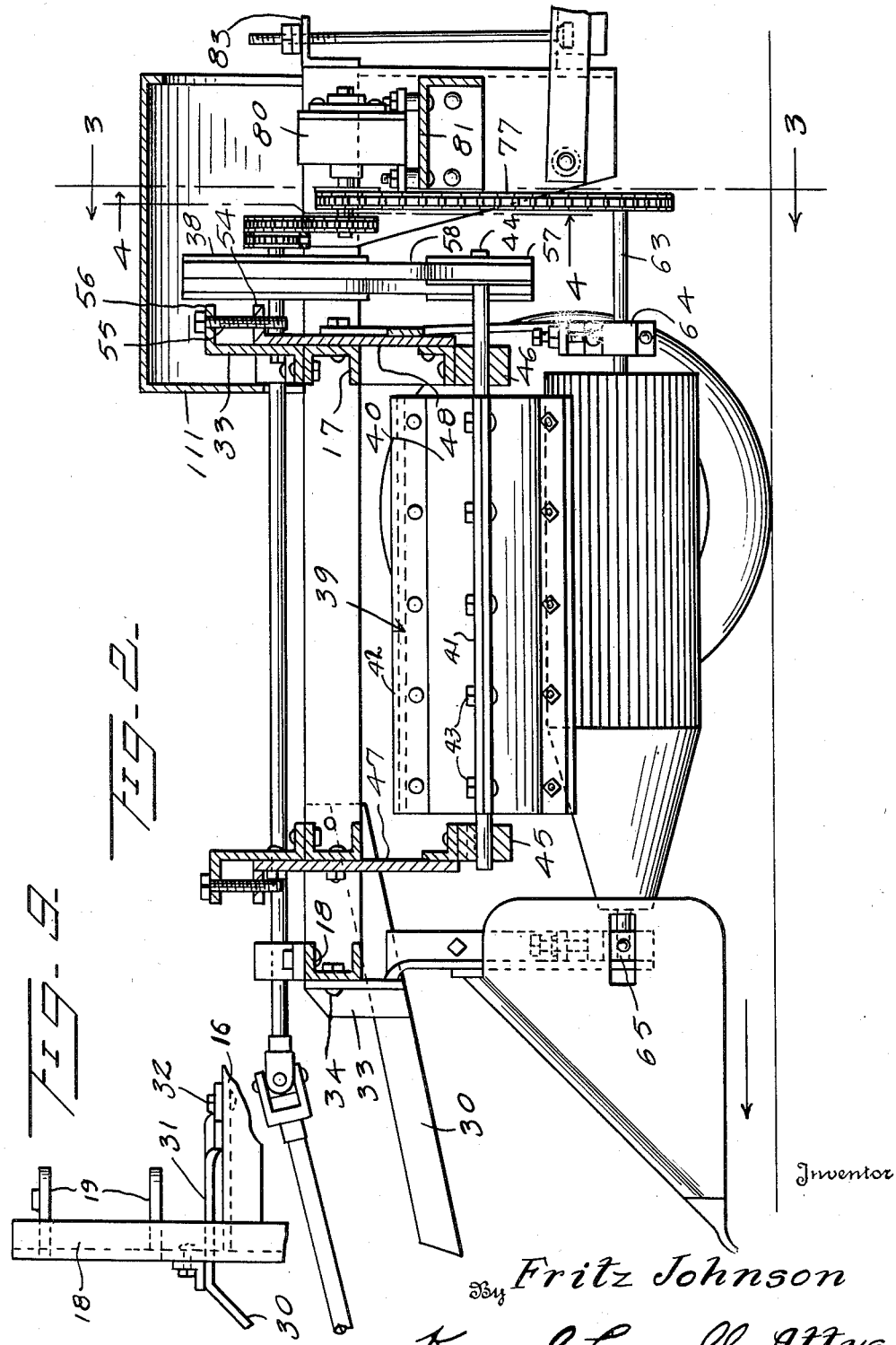
Inventor
By *Fritz Johnson*
*Kimmel & Crowell* Attys.

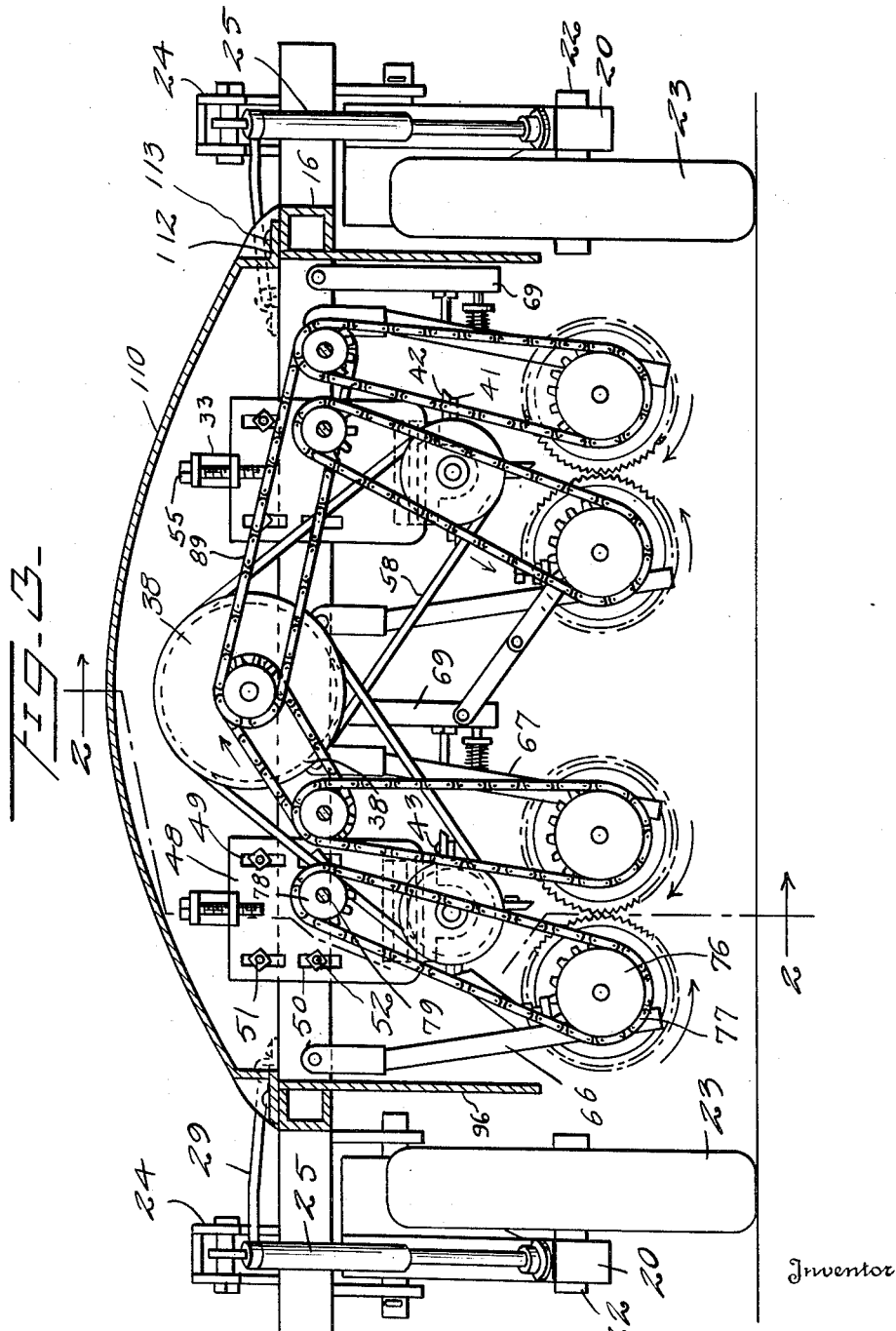

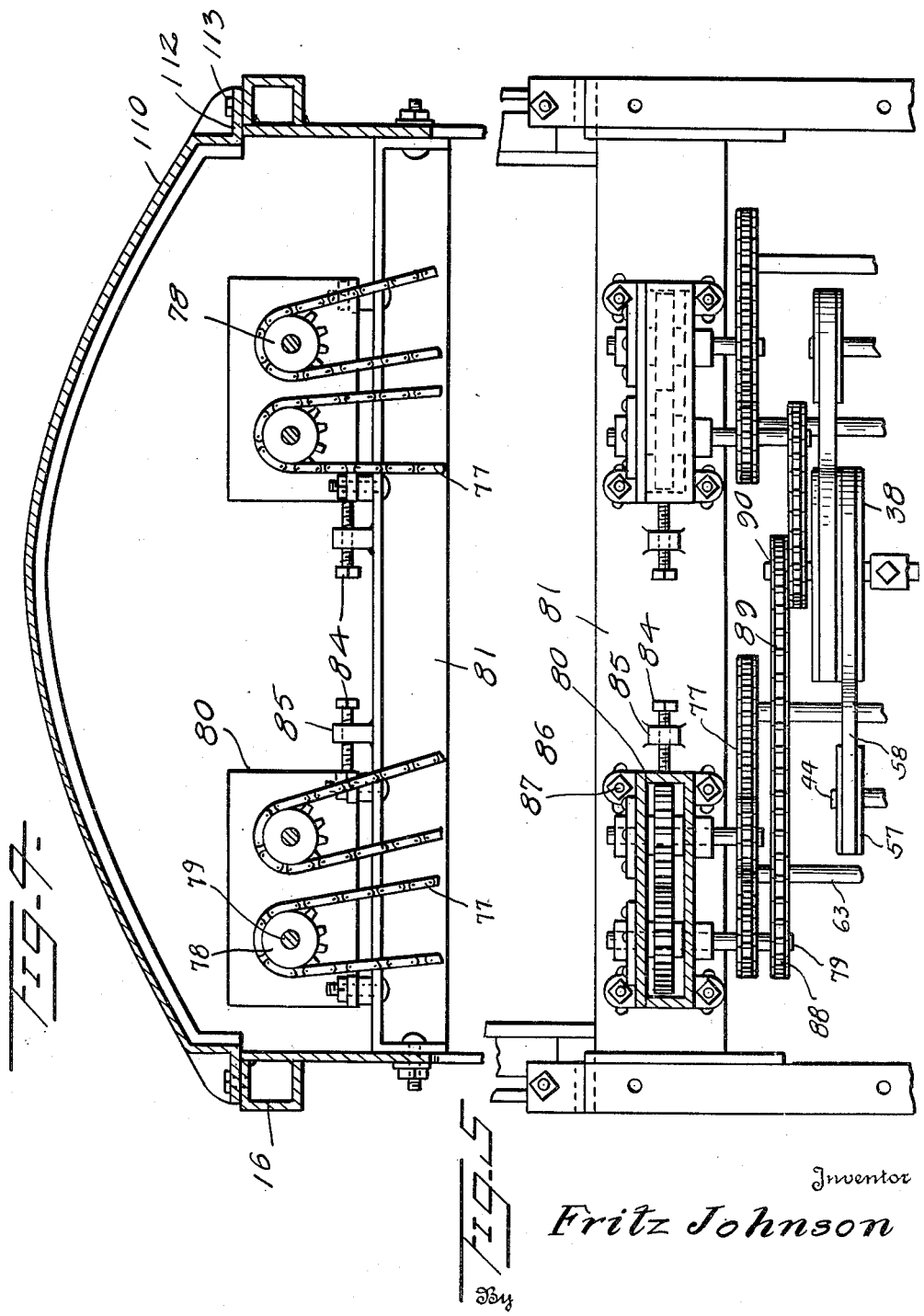

March 6, 1951 F. JOHNSON 2,544,024
VINE PULLER AND CUTTER
Filed Nov. 5, 1948 7 Sheets-Sheet 5
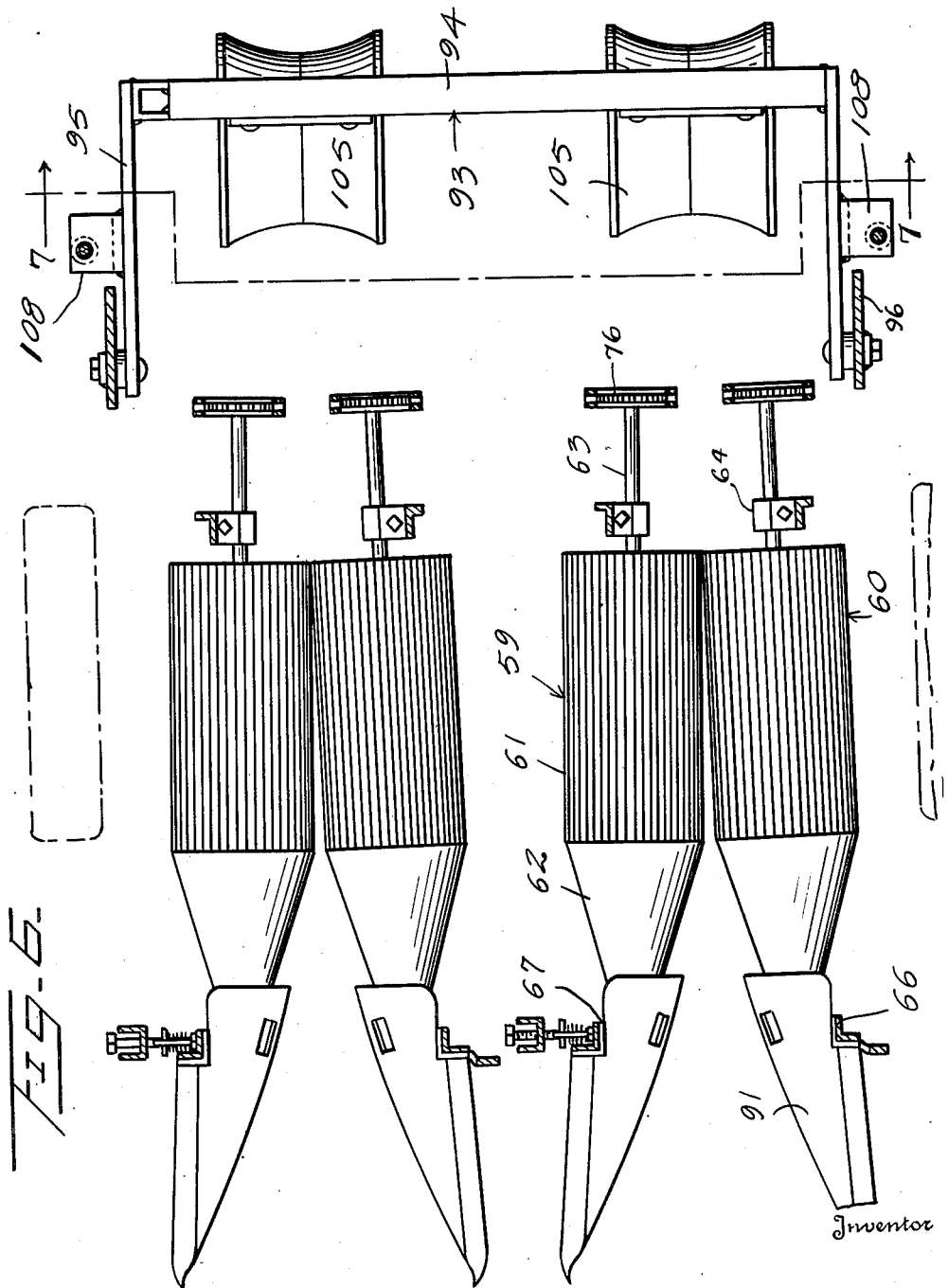
Inventor
Fritz Johnson
By
Kimmel & Crowell Attys.

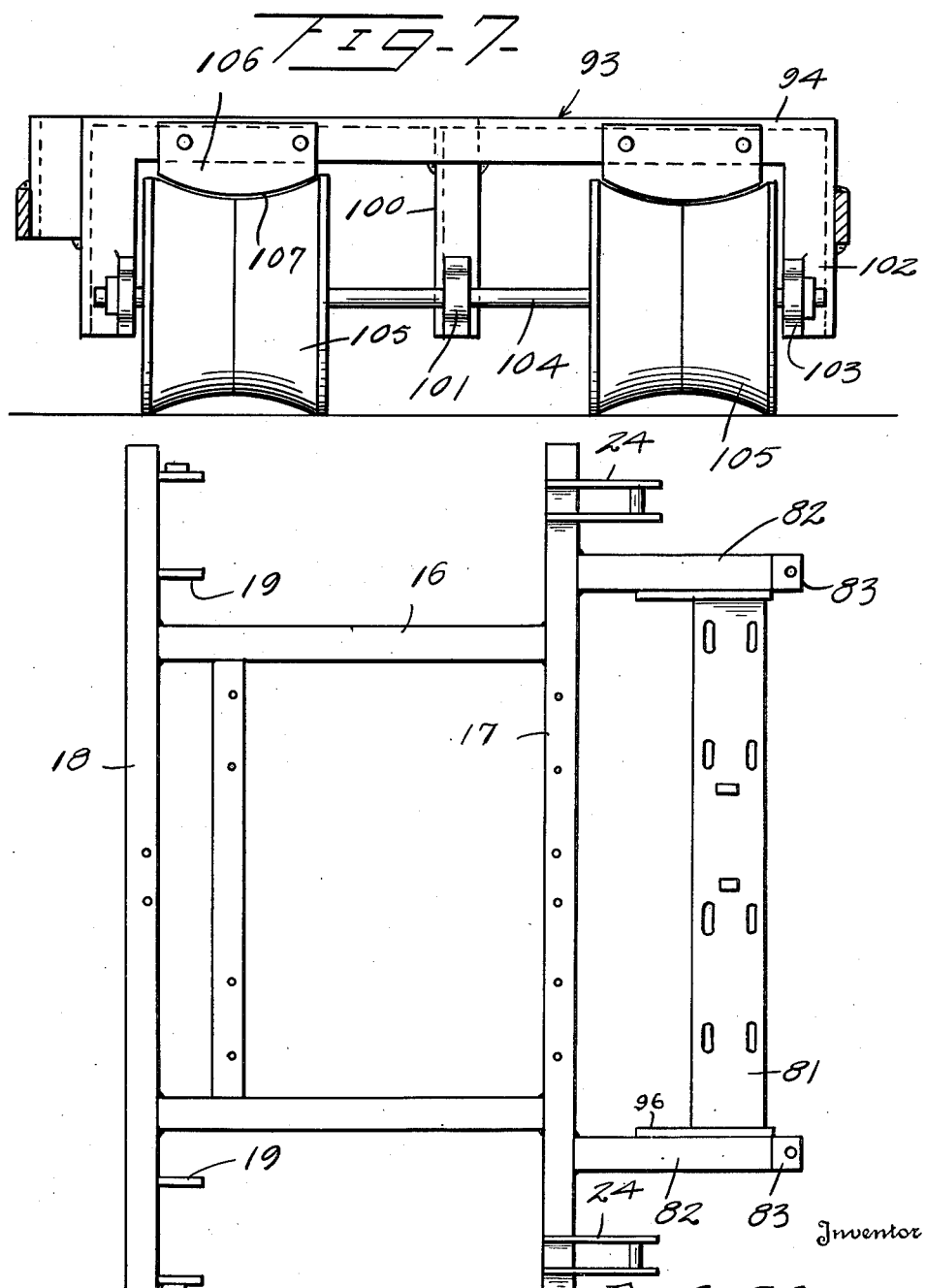

March 6, 1951 F. JOHNSON 2,544,024
VINE PULLER AND CUTTER
Filed Nov. 5, 1948 7 Sheets-Sheet 7
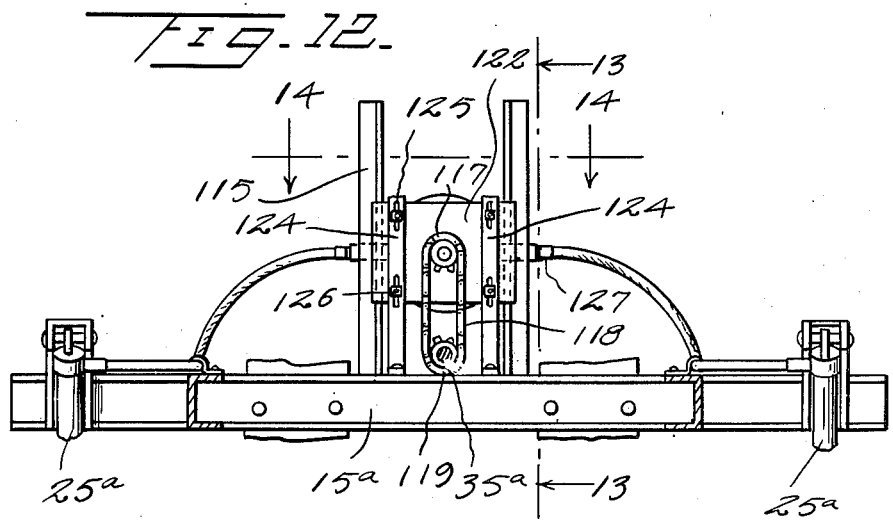
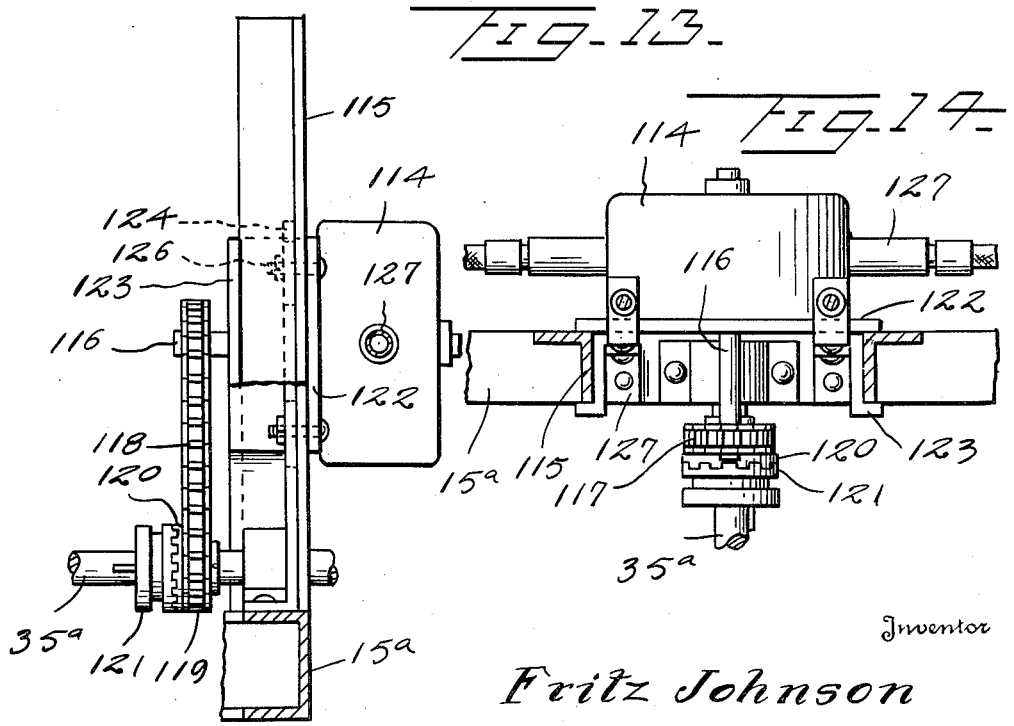
Inventor
Fritz Johnson
By
Kimmel & Crowell Attys.

Patented Mar. 6, 1951

2,544,024

UNITED STATES PATENT OFFICE 2,544,024

VINE PULLER AND CUTTER

Fritz Johnson, Idaho Falls, Idaho

Application November 5, 1948, Serial No. 58,381

8 Claims. (Cl. 55—61)

This invention relates to a machine for pulling and comminuting potato vines, weeds or the like.

An object of this invention is to provide a machine which is so constructed and arranged that it will pull potato vines without pulling the potatoes, and will then cut up the vines and deposit the cut vines onto the ground.

Another object of this invention is to provide in combination with a vine puller and cutter of this kind, rollers at the rear of the machine which will not only break up clods, but will also close the holes formed by pulling the vines so that insects or the like will not enter the ground and injure the potatoes.

A further object of this invention is to provide a machine of this kind which is so constructed that the rotary cutting member is supported above the pulling rollers so as to cut the vines while they are still gripped between the rollers.

A further object of this invention is to provide in a machine of this kind improved pulling rollers which are so constructed and rotated at such speed as to effectively pull the vines from the potatoes without breaking the vines and leaving stubs sticking above the ground.

A further object of this invention is to provide a machine of this kind wherein the pulling rollers are disposed in forwardly divergent relation, being spaced apart slightly at their forward ends so that the vines will not be broken by the rollers and there will be a gradually increased pulling force applied to the vines as they move along the lengths of the rollers.

With the use of this machine, the ripening period of the potatoes can be shortened and definitely set, as after the vines have been pulled the potatoes which are now substantially full grown are left in the ground for a week or ten days and may then be dug as fully ripened potatoes which can be immediately sacked or otherwise readied for the market.

With the above and other objects in view, my invention consists in the arrangement, combination and details of construction disclosed in the drawings and specification, and then more particularly pointed out in the appended claims.

In the drawings,

Figure 1 is a detail side elevation, partly broken away, of a vine puller and cutter constructed according to an embodiment of this invention, Figure 2 is a longitudinal section through a pair of the rollers, Figure 3 is a transverse section taken on the line 3—3 of Figure 2, Figure 4 is a fragmentary transverse section taken on the line 4—4 of Figure 2, Figure 5 is a fragmentary horizontal section taken at the rear of the machine showing the roller driving means, Figure 6 is a horizontal section taken substantially on the line 6—6 of Figure 1, Figure 7 is a sectional view taken on the line 7—7 of Figure 6, Figure 8 is a plan view of the frame structure of this machine, Figure 9 is a fragmentary plan view of the forward portion of the frame showing the drawbar connection with the frame, Figure 10 is a fragmentary vertical section showing one of the roller tensioning means, Figure 11 is a fragmentary sectional view showing the bearing and adjusting means for one of the rollers, Figure 12 is a fragmentary vertical section looking forwardly of a modified form of this invention, Figure 13 is a fragmentary sectional view taken on the line 13—13 of Figure 12, Figure 14 is a fragmentary sectional view taken on the line 14—14 of Figure 12.

Referring to the drawings and first to Figures 1 to 11 inclusive, the numeral 15 designates generally a mobile frame structure embodying a pair of longitudinal frame bars 16 having secured to the opposite ends thereof transverse frame bars 17 and 18. The frame bars 17 and 18 project beyond the longitudinal bar 16 as shown in Figure 8, the purpose for which will be hereinafter described. The frame bar 18 which is the front frame bar has secured to the laterally projecting ends a pair of bracket plates 19 between each pair of which is rockably mounted a wheel carrying lever 20.

The forward end of the lever 20 is mounted on a shaft 21 extending between the bracket plates 19 and the rear end of each lever 20 has secured thereto a spindle 22 on which a wheel 23 is rotatably mounted. The laterally projecting ends of the rear frame bar 17 have secured thereto a pair of upstanding bracket plates 24 between which is mounted the upper end of a hydraulic member 25.

The hydraulic member 25 includes a cylinder 26 and a plunger 27 which is pivotally secured as at 28 to the lever 20, rearwardly of the spindle 22. The cylinder 26 is connected by means of a tubular connecting member 29 to a source of fluid pressure supply which in the present instance is mounted on the tractor which is connected to the frame 15.

The frame 15 has fixed thereto forwardly convergent drawbars 30, and the drawbars 30, as shown in Figure 9, have obtusely bent rear portions 31 which are fixed by fastening means 32 to the longitudinal frame members 16. An angle member 33 is fixed as by welding or the like to the drawbars 30 at the forward side of the front frame member 18 and each angle member 33 is fixed by fastening means 34 to the forward side of the frame member 18.

A drive shaft 35 is journalled in bearings 36 carried by the upper side of the frame 15, and the shaft 35 includes a universal joint 37 disposed at the forward end of the frame 15. The shaft 35 is adapted to be connected to the power take off of the tractor and the rear end of the shaft 35 has mounted thereon a relatively large driving pulley 38.

A pair of rotatable cutting members 39 are disposed below the frame 15 and each cutting member 39 includes a cylindrical body 40 having secured thereto longitudinal flanges 41 to which cutting blades 42 are secured by fastening means 43. A shaft 44 is journalled in bearings 45 and 46 which are fixed to vertically disposed plates 47 and 48 respectively. The plates 47 and 48 are of like construction and as shown in Figure 3, includes pairs of vertical elongated slots 49 and 50 through which fastening means 51 and 52 respectively are adapted to engage. The fastening means 52 extend through the transverse frame bars 17 and 18, whereas the fastening means 51 extend through an L-shaped member 53 which is fixed to a transverse frame member.

The upper end of each plate 47 and 48 is provided with a right angularly disposed nut or lug 54 through which is threaded a bearing adjusting bolt 55. The right angle member 53 is provided at its upper end with a right angularly disposed lug 56 through which the bolt 55 engages. Each shaft 44 has secured thereto a relatively small grooved pulley 57 about which a driving belt 58 is trained, and the belt 58 also engages in one of a pair of grooves formed in the large driving pulley 38.

There are two rollers 59 and 60 for each cutting member 39 with the two rollers disposed below the associated cutting member, and with the axis of the cutting member substantially in a vertical plane of the meeting line between the two rollers 59 and 60. Each roller comprises a fluted or ribbed cylindrical body 61 formed with a tapered or cone-shaped forward end 62, and a shaft 63 extends through the roller, projecting from the opposite ends thereof, and the shaft 63 is journalled in vertically adjustable bearings 64 and 65.

The bearings 64 are secured to depending bearing supporting bars 66 and 67, and the bearings 65 are secured to similar depending bars carried by the frame 15. The bar 66 is fixed relative to the frame 15 whereas the bar 67 is pivoted at its upper end on a pivot member 68. A depending bar 69 is fixed to the frame 15, and a spring 70 is interposed between the bearing supporting bar 67 and the depending bar 69.

A spring tensioning flanged plug 71 is mounted on a bolt 72 which is threaded through the bar 69 so that the spring 70 may be tensioned to the desired degree. In this manner one of the rollers, such as roller 59, may be spring tensioned toward the other roller 60. A stop pin 73 is adjustably carried by the fixed bar 69, extending in the direction of the bearing supporting member 67 so as to limit the outward swinging of the supporting member 67 and the roller 59.

Each bearing 64 and 65 is adapted to be vertically adjusted by means of an adjusting screw 74 which is threaded through a nut 75 fixed to a bearing supporting member such as member 67, as shown in Figure 11. Each roller shaft 63 has fixed to the rear end thereof a sprocket 76 about which a chain 77 engages. The chain 77 extends upwardly and is trained about an upper sprocket 78 which is fixed to a shaft 79 extending from a gear housing 80.

The housing 80 is mounted on a horizontally disposed supporting bar 81 which, as shown in Figure 8, is fixed between a pair of rearwardly extending bars 82. The bars 82 are fixed at their forward ends to the rear transverse bar 81, and each bar 82 has secured to the rear end thereof a rearwardly projecting lug 83.

Each gear housing 80 is adapted to be laterally adjusted on the supporting bar 81 by means of an adjusting screw or bolt 84 which is threaded through a nut 85 pivotally carried by the supporting bar 81. The bar 81 is formed with elongated slots 86 through which the gear housing securing means 87 engage.

As shown in Figure 3, there are two shafts 79 extending from the gear housing 80 and the innermost one of the shafts 79 includes a small sprocket 88 about which a chain 89 is trained. The chain 89 extends inwardly and is trained about a sprocket 90 which is fixed to the shaft 35. As shown in Figure 3, there are two chains 89, one extending to the left and the other to the right, with the latter chain extending to the outermost sprocket 88.

The frame 15 has secured to the forward portion thereof two pairs of rearwardly convergent shields or guides 91 which are secured to the forward roller supporting bars 66 and 67. A roller frame generally designated as 93 is disposed at the rear of the frame 15 and includes an inverted frame member 94 which has fixed thereto a pair of forwardly extending bars 95.

The bars 82 which extend rearwardly from the transverse bar 81 have fixed thereto depending plates 96 and the forward ends of the arms 95 are pivotally mounted on pivot members 97 which extend through the plates 96. As shown in Figures 1 and 2, the gear housing supporting bar 81 is fixed between the depending plates 96 and the latter is formed with vertical elongated slots 98 through which bolts 99 engage. In this manner the bar 81 may be vertically adjusted to tighten or loosen the chains 77.

The U-shaped member 94 has fixed to the bight thereof a depending bar 100, and a bearing 101 is secured to the lower portion of the bar 100. The depending legs 102 of the U-shaped member 94 have fixed thereto bearings 103 and a roller shaft 104 is journalled through the bearings 101 and 103. A pair of concave rollers 105 are mounted on the shaft 104 and disposed one each in alignment with a pair of pulling rollers 59 and 60. The rollers 105 are adapted to ride on top of the hill of the potato row and are formed with a concave peripheral surface so that the hill will be rounded. These rollers provide that the hole formed in the ground by pulling the vines will be filled and any clods of dirt will also be smoothly rolled.

Each roller 105 has associated therewith scraper blade 106 which is secured to the bight of the U-shaped member 94 and is provided with a convex lower edge 107 disposed in substantial contact with the concave peripheral surface of a roller 105. In this manner when the rollers are moving over wet ground and dirt sticks to these rollers, the dirt will be scraped from the rollers so that the dirt will not accumulate on these rollers.

The roller frame 93 is limited in its downward movement but is permitted free upward movement by means of a pair of depending rods 107 which are secured to laterally projecting lugs 108 carried by the arms 95. The rods 107 loosely extend through the lugs 83 and nuts 109 are threaded on the upper ends of the rods 107.

A dome-shaped guard 110 is disposed over the rear portion of the frame 15, engaging over the pulley 38 and also over the gear housings 80. The guard or shield 110 is provided with a vertical forward wall 111 and is preferably open at the rear thereof. The lateral ends of the guard or shield 110 are provided with base flanges 112 secured by fastening means 113 to the longitudinal frame members 16.

Referring now to Figures 12 to 14 inclusive, there is disclosed a modified form of this invention. This modification relates to the operating means for raising and lowering the frame. In certain instances the tractor used to pull the machine over the ground is not provided with a hydraulic system, or in certain instances this system is not of sufficient power to provide the necessary pressure for raising and lowering the frame of the machine. Where sufficient hydraulic pressure is not available, a hydraulic pump 114 is provided which is mounted between a pair of vertically disposed guide bars 115 secured to the frame 15a. The pump 114 includes a shaft 116 on which a sprocket 117 is secured, and a chain 118 is trained about the sprocket 117. A sprocket 119 is loosely mounted on the drive shaft 35a and is formed on one face thereof with a clutch face 120 confronting a sliding clutch element 121 mounted on the shaft 35a.

The clutch embodying the clutch elements 120 and 121 is here shown as a dental or toothed clutch and conventional operating means will be provided for shifting the clutch element 121 into and out of engagement with the clutch element 120. The pump 114 is mounted on a plate 122 which bears against one face of the vertical guide bars 115 and angle members 123 are fixed to the plate 122 and engage the opposite sides of the guide bars 115. Vertically disposed bars 124 are fixed to the frame 15a and the bars 124 are provided with elongated slots 125 through which securing bolts 126 are extended. The pump 114 is provided with a pair of outlets 127 which are adapted to be connected to the hydraulic members 25a, similar to the hydraulic members 25.

In the use and operation of this machine, the machine is connected by the drawbars 30 to a tractor, and where the tractor includes a hydraulic pump this pump is connected by the tubular member 29 to the hydraulic members 25. The height of the frame and the pulling rollers relative to the rows of potatoes is initially adjusted so that the rollers 59 and 60 will be disposed slightly above the tops of the rows. The machine is then pulled over the ground with the concave rollers 105 riding on top of the ridge formed normally along the rows of potatoes. The upstanding potato vines will be guided toward the leading tapered ends of the pulling rollers 59 and 60 and as these rollers are moving in opposite directions in a manner to pull the vines upwardly, the vines will enter the space between the forward ends of the rollers 59 and 60 and will be grasped by the ribs of these rollers and quickly jerked upwardly. As the vines move upwardly from the rollers 59 and 60, the vines will be cut into relatively small pieces by the rapidly rotating cutters 39. The cut vine will be blown out laterally of the machine by the draft of air created by the cutters 39. With a machine of this kind the vines will be jerked out of the ground without disturbing the potatoes which at this time are substantially full grown. By providing for cutting of the vines as they are being pulled, these vines will be used as fertilizer after the potatoes have been dug by a following potato digger. In practice the potatoes are left in the ground without the vines for a period of from a week to ten days so as to ripen the potatoes, after which they are dug and may be immediately sacked.

I do not mean to confine myself to the exact details of construction herein disclosed, but claim all variations falling within the purview of the appended claims.

What I claim is:

1. A vine puller and cutter for connection with a tractor and the power take-off of the tractor, comprising a mobile frame having a front and rear, a pair of pulling rollers disposed in side by side relation below said frame, means connected with said frame and rollers rotatably supporting said rollers with the axes thereof disposed lengthwise of said frame, an elongated rotatable cutter carried by said frame above and closely adjacent said rollers, said cutter including longitudinally disposed elongated blades, said blades extending radially of the axis of rotation of the cutter for cutting the vines pulled by said rollers and for creating a lateral draft of air to thereby blow the cut vines laterally of the frame, and means carried by said frame for connection with the power take-off for rotating said rollers and cutter.

2. A vine puller and cutter comprising a mobile frame having a front and rear, a pair of pulling rollers disposed in side by side relation below said frame and disposed lengthwise thereof, the axes of said rollers being disposed in the same horizontal plane, depending supporting members connected between said frame and rollers rotatably supporting the latter longitudinally of said frame, a cutter rotatably carried by said frame and disposed above and lengthwise of said rollers in a position closely adjacent said rollers to cut the vines rising between said rollers, said cutter including longitudinally disposed elongated blades, said blades extending radially of the axis of rotation of the cutter, and means carried by said frame for rotating said cutter and rollers.

3. A vine puller and cutter for connection with a tractor and the power take-off of the tractor, comprising a mobile frame having a front and rear, a draft bar carried by the front of said frame for connection with the tractor, a pair of puller rollers disposed in side by side relation rotatably carried by and disposed below said frame with the axes thereof disposed lengthwise of said frame, a rotatable cutter carried by said frame above and closely adjacent said rollers and substantially parallel therewith, said cutter including longitudinally disposed elongated blades, said blades extending radially of the axis of rotation of the cutter, a drive shaft rotatably carried by said frame adapted for connection with the power take-off of the tractor, means connected with said drive shaft, said rollers and said cutter for rotating said rollers and cutter, a concave ground smoothing roller, and means carried by and projecting rearwardly of said frame connecting said smoothing roller with said frame and disposing the smoothing roller below the level of said rollers and transversely of the path of the latter for smoothing the ground disturbed by the pulled vines.

4. A vine puller and cutter for connection with a tractor and the power take-off of the tractor, comprising a mobile frame having a front and rear, a pair of pulling rollers disposed in side by side relation below said frame, means connected with said frame and rollers rotatably supporting said rollers with the axes thereof disposed lengthwise of said frame, an elongated rotatable cutter carried by said frame above and closely adjacent said rollers, means carried by the front and rear of the frame vertically adjusting said cutter relative to said rollers, said cutter including longitudinally disposed elongated blades, said blades extending radially of the axis of rotation of the cutter for cutting the vines pulled by said rollers and for creating a lateral draft of air to thereby blow the cut vines laterally of the frame, and means carried by said frame for connection with the power take-off for rotating said rollers and cutter.

5. A vine puller and cutter comprising a mobile frame having a front and rear, a pair of pulling rollers disposed in side by side relation below said frame and disposed lengthwise thereof, the axes of said rollers being disposed in the same horizontal plane, depending supporting members connected between said frame and rollers rotatably supporting the latter longitudinally of said frame, a cutter rotatably carried by said frame and disposed above and lengthwise of said rollers in a position closely adjacent said rollers to cut the vines rising between said rollers, said cutter including longitudinally disposed elongated blades, said blades extending radially of the axis of rotation of the cutter, means carried by the front and rear of the frame vertically adjusting said cutter relative to said rollers, and means carried by said frame for rotating said cutter and rollers.

6. A vine puller and cutter for connection with a tractor and the power take-off of the tractor, comprising a mobile frame having a front and rear, a draft bar carried by the front of said frame for connection with the tractor, a pair of puller rollers disposed in side by side relation rotatably carried by and disposed below said frame with the axes thereof disposed lengthwise of said frame, a rotatable cutter carried by said frame above and closely adjacent said rollers and substantially parallel therewith, said cutter including longitudinally disposed elongated blades, said blades extending radially of the axis of rotation of the cutter, means carried by the front and rear of the frame vertically adjusting said cutter relative to said rollers, a drive shaft rotatably carried by said frame adapted for connection with the power take-off of the tractor, means connected with said drive shaft, said rollers and said cutter for rotating said rollers and cutter, a concave ground smoothing roller, and means carried by and projecting rearwardly of said frame connecting said smoothing roller with said frame and disposing the smoothing roller below the level of said rollers and transversely of the path of the latter for smoothing the ground disturbed by the pulled vines.

7. A vine puller and cutter comprising a frame having a front and rear and adapted for attachment to a tractor, a pair of wheel carrying arms rockably secured to said frame adjacent the front thereof and extending downwardly and rearwardly, a traction wheel rotatably carried by the rear portion of each arm, means connected between said frame and arms for rocking said arms to thereby raise or lower said frame, a pair of depending bars fixedly secured to the front and rear of said frame, a roller journalled between said bars, a second pair of depending bars swingably secured at their upper ends to the front and rear of said frame, a second roller journalled between said second pair of bars and cooperating with said first roller to pull vines vertically, means carried by said frame adjusting said second pair of bars relative to said first pair of bars, a rotatable cutter above and longitudinally of said rollers, said cutter including longitudinal blades disposed radial to the axis of rotation of the cutter, a pair of bearing supporting plates for said cutter, means carried by said frame adjusting said plates relative to said frame to dispose said cutter in adjusted position relative to said rollers, and means for rotating said cutter and rollers.

8. A vine puller and cutter comprising a frame having a front and rear and adapted for attachment to a tractor, a pair of wheel carrying arms rockably secured to said frame adjacent the front thereof and extending downwardly and rearwardly, a traction wheel rotatably carried by the rear portion of each arm, hydraulic arm adjusting means connected between said frame and arms for rocking said arms to thereby raise or lower said frame, a pair of depending bars fixedly secured to the front and rear of said frame, a roller journalled between said bars, a second pair of depending bars swingably secured at their upper ends to the front and rear of said frame, a second roller journalled between said second pair of bars and cooperating with said first roller to pull vines vertically, means carried by said frame adjusting said second pair of bars relative to said first pair of bars, a rotatable cutter above and longitudinally of said rollers, said cutter including longitudinal blades disposed radial to the axis of rotation of the cutter, a pair of bearing supporting plates for said cutter, means carried by said frame adjusting said plates relative to said frame to dispose said cutter in adjusted position relative to said rollers, and means for rotating said cutter and rollers.

FRITZ JOHNSON.

REFERENCES CITED

The following references are of record in the file of this patent:

UNITED STATES PATENTS

| Number | Name | Date |
|---|---|---|
| 1,110,785 | Hubert | Sept. 15, 1914 |
| 1,205,721 | Elkins | Nov. 21, 1916 |
| 1,269,111 | Oliver | June 11, 1918 |
| 1,358,302 | Ellis | Nov. 9, 1920 |
| 1,379,571 | Jones | May 24, 1921 |
| 1,507,656 | Bartosz | Sept. 9, 1924 |
| 2,066,864 | Tucker | Jan. 5, 1937 |